US006267574B1

(12) United States Patent
Bowman et al.

(10) Patent No.: US 6,267,574 B1
(45) Date of Patent: Jul. 31, 2001

(54) COMPACTING PRESS WITH PICKER SYSTEM

(75) Inventors: Matthew D. Bowman, Geneva; Donald J. Knott, Bristol, both of IL (US)

(73) Assignee: AMSTED Industries Incorporated, Chicago, IL (US)

( * ) Notice: Subject to any disclaimer, the term of this patent is extended or adjusted under 35 U.S.C. 154(b) by 0 days.

(21) Appl. No.: 09/366,126

(22) Filed: Aug. 2, 1999

(51) Int. Cl.[7] .................................................... B29C 43/50
(52) U.S. Cl. ......................... 425/78; 425/444; 425/436 R
(58) Field of Search ................................. 425/78, 436 R, 425/436 RM, 444, 403.1, 422, 556

(56) References Cited

U.S. PATENT DOCUMENTS 4,662,835 * 5/1987 Fukuda et al. ....................... 425/145
5,812,924 * 9/1998 Shaffer et al. ......................... 425/78
5,858,415 * 6/1999 Bequette et al. ....................... 425/78

OTHER PUBLICATIONS

Amsted Industries, Inc., Description of Prior Art Pneumatic Picker System, Nov. 2, 1999, pp. 1–2 and attached photograph.

* cited by examiner

*Primary Examiner*—Nam Nguyen
*Assistant Examiner*—Thu Khanh Nguyen
(74) *Attorney, Agent, or Firm*—Edward J. Brosius

(57) ABSTRACT

A press for making compacts out of raw material such as metal powder is disclosed. The press includes a removable picker system. The picker system has an elongate guide rail element and a gripper assembly fixed to a slide mounted on the guide rail. The gripper assembly may move toward and away from a die in the press platen to pick up and move a compact that has been ejected from the die. The gripper assembly has gripper arms and gripper fingers that move toward and away from a central vertical longitudinal plane that runs through the center of the die. The guide rail provides the sole support for the gripper assembly, and the guide rail is offset from the central vertical longitudinal plane. The picker system allows access to the die for inspection, cleaning or changing of the die without removing the picker system; the gripper assembly can be moved down the guide rail element away from the die to provide access to the die. The picker system is mounted on the platen on an upright mounting post that is spaced from the die. The picker system may be mounted and removed from the press by sliding it vertically on the upright mounting post.

20 Claims, 4 Drawing Sheets

COMPACTING PRESS WITH PICKER SYSTEM

BACKGROUND OF THE INVENTION

1. Field of the Invention.

The present invention relates to a compacting press that includes a picker system for removing a green compact from the press.

2. Description of the Prior Art.

It is known to produce metal parts by compacting metal powder and heating the compacted metal powder to sinter the metal particles to produce a finished metal product. In one type of commercially available compacting press, metal powder is typically delivered to a feed shoe, or shuttle assembly. The feed shoe is movable on the press table between a retracted position and an extended position. In the extended position, metal powder in the feed shoe drops into a die cavity. The feed shoe is then retracted and then upper and lower punches compact the metal powder in the die cavity to form a green compact. A core rod is also extended to form any inner diameter of the powder metal part. The green compact is then ejected from the die cavity.

The green compact must then be removed from the area of the die and punches. At this stage of manufacture, the green compacts are relatively fragile, and require careful or sensitive handling. One prior art system for picking up and removing fragile green compacts from a press is illustrated in FIG. 1. As there shown, the prior art press 10 includes a platen 12 with a space or cavity in the platen holding a die 14. The prior art press includes a feed shoe assembly, shown schematically at 16, and a picker assembly 18 aligned opposite the feed shoe assembly 16, with the die 14 between them. The upper and lower punches (not shown) are vertically aligned with the die 14.

The prior art picker assembly 18 includes a support frame 20. The support frame 20 has a front rail 22, a back rail 24 and spaced side rails 26, 28. The frame includes two rods 27, 29 fixed to the side rails 26, 28 and supporting the frame on the platen surface. The two rods 27, 29 are not fixed to the platen, and the frame is pivotable about a horizontal axis where the rods rest atop the platen 12, such as shown at 30 in FIG. 1. The ends of the front rail 22 are clamped to plates 32 above bellows 34 of bellow assemblies. The bellow assemblies are fixed to the platen through threaded connections to studs extending upward from the platen.

A commercially available guide rail component 36 is mounted on the support frame 20. The guide rail component is a "ULTRAN SLIDE" rodless cylinder supplied by Bimba Manufacturing Company of Monee, Illinois. This guide component has two spaced parallel guide rods 38, 39 with a tube 40 between the two guide rods 38, 39. The tube 40 is hollow and carries an interior piston. A slide 42 is mounted on the tube 40 and guide rods 38, 39, and is magnetically driven by movement of the piston in the tube 40. The hollow tube 40 is connected to a source of pressurized air to drive the piston back and forth within the tube. The slide 42 has bearings that travel along the guide rods 38, 39. A gripper assembly 44 depends from an extension plate 46 that is fixed to the bottom of the slide 42.

The gripper assembly 44 includes a spacer block 48 fixed to the extension plate 46. On opposite sides of the spacer block 48, the gripper assembly includes two commercially available pneumatic cylinders 50. Each pneumatic cylinder 50 is connected to move one gripper arm 52 toward and away from each other. Opposite the pneumatic cylinders 50, each gripper arm 52 has a gripper finger 54. The two gripper fingers 54 extend toward each other and are shaped for picking up and carrying one or more green compacts (not shown).

A vertical central longitudinal plane 56 intersects the center of the die 14, and is centered between the gripper fingers 54. A vertical central transverse plane 58 intersects the vertical central longitudinal plane 56. The vertical central longitudinal plane 56 intersects the feed shoe 16, the tube 40 and slide 42 of the guide rail component 36, the front and back rails 22, 24 as well as the punches (not shown).

In operation, the gripper assembly 44 is spaced away from the die 14 when the feed shoe 16 delivers raw material to the die and when the punches move to compact the raw material in the die 14. After a green compact has been ejected from the die 14, the tube 40 is pressurized to thereby move the slide 42 toward the front rail 22, thereby moving the gripper assembly 44 toward the ejected compact. At this point, the gripper arms and gripper fingers are spaced apart from each other. To pick up the green compact, the pneumatic cylinders 50 are actuated to move the gripper arms 52 toward each other and toward the vertical central longitudinal plane 56. After the gripper fingers 54 contact the green compact, the bellows 34 are inflated to pivot the frame 20 about axis 30, thereby lifting the gripper arms 52, gripper fingers 54 and green compact. The pressure in tube 40 is then changed to move the piston and slide away from the front rail 22 and toward the back rail 24. The bellows remain inflated while the gripper arms, gripper fingers and compact are retracted. Thus, the gripper assembly 44 and green compact are moved away from the die, and may be placed on a conveyor or other system or support at a location spaced from the press.

As can be appreciated from FIG. 1, the combination of the feed shoe 16 and picker assembly 18 substantially obstruct the view of and block access to the die 14, particularly taking the position of the upper punch into consideration. To fully view the die cavity, to change the die over, to clean the die, or to work on the other tooling such as the punch requires removal of the entire picker assembly. Removal and reinstallation of the picker assembly requires removing and reinstalling the support frame from the press platen, typically by unclamping the frame from the bellows assemblies. Removal and reinstallation of the picker assembly adds to the set up time, thereby reducing manufacturing efficiency.

SUMMARY OF THE INVENTION

The present invention is directed to increasing efficiency in the manufacture of compacts. In one aspect, the present invention increases efficiency by providing a press for making compacts from a raw material. The press comprises a platen with a die space and a die in which raw material may be formed into a compact and from which the compact may be ejected. The die is in the die space in the platen. The press has a vertical press longitudinal plane at the center of the die space in the platen and a vertical press transverse plane perpendicular to the press longitudinal plane. The press longitudinal and transverse planes are substantially perpendicular to the surface of the platen. A guide rail element is laterally spaced from the die. The guide rail element is offset from the press longitudinal plane, and is on one side of the press transverse plane. A slide is mounted on the guide rail element for movement of along the guide rail element in a direction parallel to and spaced from the press longitudinal plane. The guide rail element remains on one side of the press transverse plane throughout the range of motion of the slide. A pair of gripper arms is supported for movement with the slide. One gripper arm is on each side of the press longitudinal plane. At least a portion of each of the gripper arms is movable toward and away from the press longitudinal plane to engage and release a compact. The gripper arms are offset along the press transverse plane from the slide.

In another aspect, the present invention increases efficiency by providing a press for making compacts from a raw material. The press comprises a platen with a die space and a die in which raw material may be formed into a compact and from which the compact may be ejected. The die is in the die space in the platen. An upright mounting post is on the platen, spaced from the die and the die space. The press includes a picker system for moving compacts. The picker system includes a guide rail element and a movable gripper assembly mounted on the guide rail element. The picker system is removably mounted on the upright mounting post so that the guide rail element extends outward substantially horizontally from the upright mounting post. The picker system is slidable vertically on the upright mounting post to mount and remove the picker system. The mounting post is positioned so that the entire guide rail element is spaced from the die and the die space. The gripper assembly is movable to a position overlying the die and the die space.

In another aspect, the present invention increases efficiency by providing a press for making compacts from a raw material. The press comprises a platen with a die space and a die in which raw material may be formed into a compact and from which the compact may be ejected. The die is in the die space. The press has a vertical press longitudinal plane at the center of the die space in the platen and a vertical press transverse plane perpendicular to the press longitudinal plane. The press longitudinal and transverse planes are substantially perpendicular to the surface of the platen. An upright mounting post extends upwardly from the surface of the platen at a position spaced from the die space and the die. A picker system is provided for moving the compacts. The picker system includes a guide rail element laterally spaced from the die. The guide rail element is offset from the press longitudinal plane and is positioned on one side of the press transverse plane. The picker system also includes a slide mounted on the guide rail element for movement of along the guide rail element in a direction parallel to and spaced from the press longitudinal plane. The picker system includes a pair of gripper arms supported for movement with the slide. One gripper arm is on each side of the press longitudinal plane. At least a portion of each of the gripper arms is movable toward and away from the press longitudinal plane to engage and release a compact. The gripper arms are offset from the slide. The guide rail element remains on the same side of the press transverse plane throughout the range of motion of the slide. The picker system is removably mounted on the upright mounting post so that the guide rail element extends outward substantially horizontally from the upright mounting post. The picker system is slidable vertically on the upright mounting post to mount and remove the picker system.

BRIEF DESCRIPTION OF THE DRAWINGS

In the drawings, like numbers have been used for like parts and.

DETAILED DESCRIPTION

Figure 2:
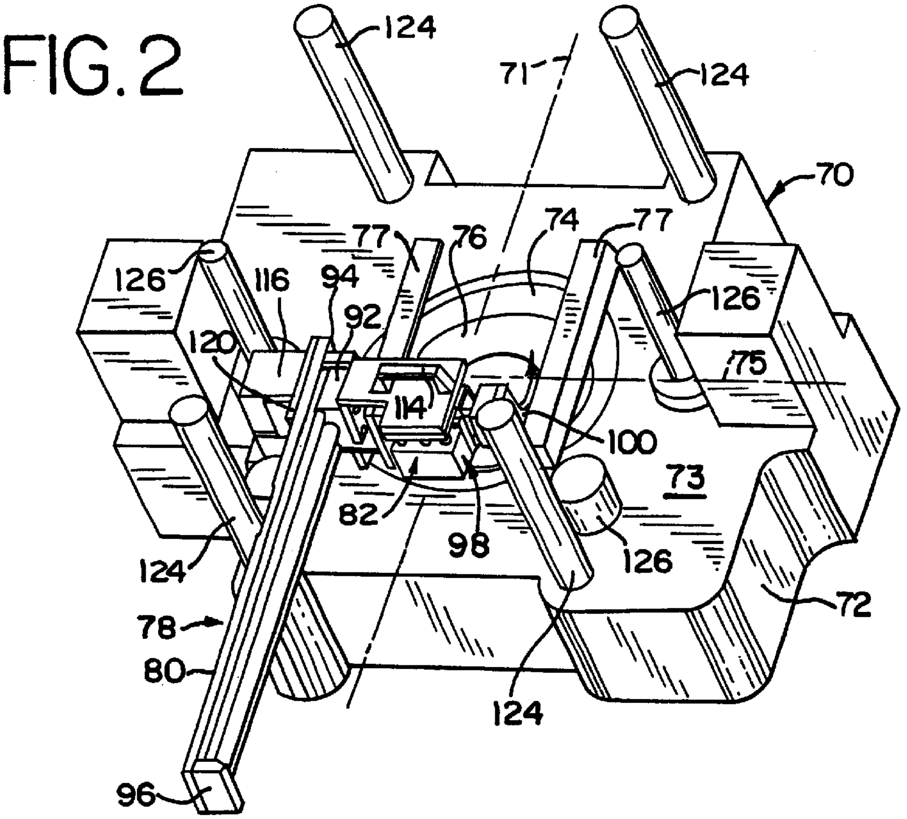
FIG. 2 is a perspective view of a press embodying the principles of the present invention, showing a picker system embodying the principles of the present invention mounted on a press platen, and with parts of the press removed for clarity, with the gripper assembly at the front end of the guide rail element of the picker system.

According to the present invention, there is provided a press 70 for compacting raw material into a compact during a cycle of operation. As shown in FIG. 2, the press 70 is an assembly of components that includes a vertically movable platen 72. The platen 72 has an upper surface 73 with a die space 74. A die 76 is below the surface 73 of the platen 72 and is in the die space 74 in the platen. The press 70 also includes a feed shoe (not shown), a raw material supply path (not shown) and one or more vertically-movable punches (not shown).

The press 70 has a vertical central longitudinal plane shown at 71 and a vertical transverse plane 75 perpendicular to the longitudinal plane 71. The central longitudinal plane 71 extends through the center of the die 76 and die space 74. In the illustrated embodiment, a set of rails 77 are fixed to the surface 73 of the platen 72, extending across the die space 74 and serving as guides for the feed shoe (not shown).

In operation, the feed shoe slides across the surface 73 of the platen to deliver raw material such as metal powder to the die. The metal powder drops into the die and the feed shoe is retracted. The rails 77 guide movement of the feed shoe and keep it pressed against the surface of the platen. The vertically-movable punch or punches are vertically aligned with the die space 74 and the die 76 and are movable to compact the raw material in the die. After the punch or punches have compacted the raw material in the die to form a green compact, the compact is ejected from the die, usually by moving the platen vertically downward. The compact is then supported on the lower punch at the level of the platen surface 73. At this stage of processing, the green compacts are typically fragile, and must be handled carefully to avoid damage prior to sintering and other processing.

Figure 3:
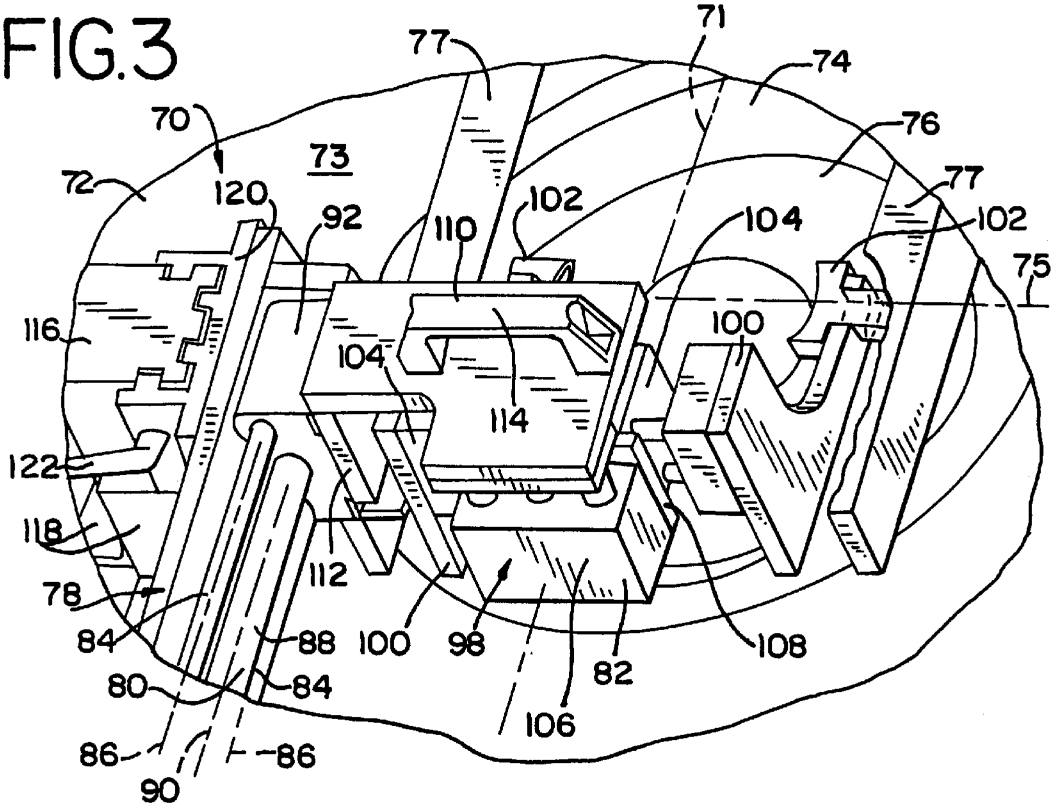
FIG. 3 is an enlarged perspective view of the gripper assembly and one end of the guide rail component of the press of FIG. 2.

The present invention provides a unique picker system 78 for use with the press 70 in picking up fragile green compacts that have been ejected from the die 76, and moving the raised compacts away from the die 76. As shown in FIGS. 2–3, the picker system 78 of the present invention includes a guide rail element 80 and a movable gripper assembly 82.

In the illustrated embodiment, the guide rail element 80 is an assembly that includes a plurality of vertically aligned and vertically spaced elongate guide rods 84. The elongate guide rods 84 have parallel central longitudinal axes 86 lying in a single vertical plane. Midway between the elongate guide rods 84 is an elongate tube 88 having a central longitudinal axis 90 parallel to and in the same vertical plane as the axes 86 of the rods 84. All of the axes 86, 90 of the guide rods 84 and the tube 88 are horizontal.

Figure 6:
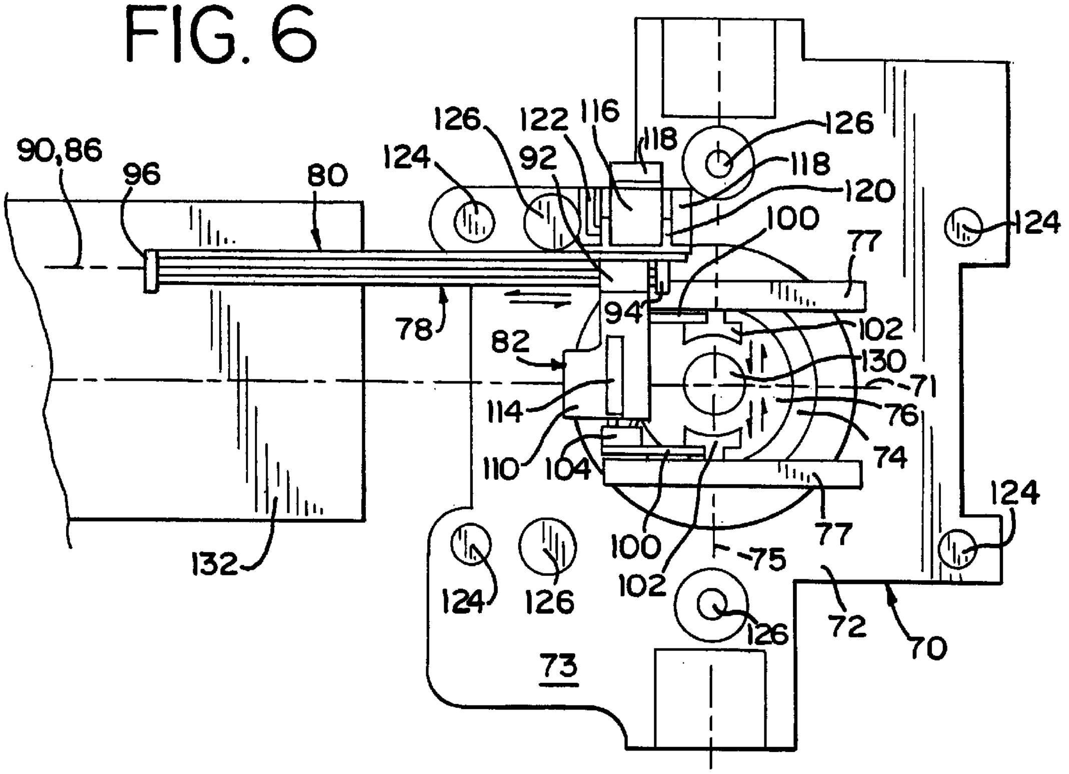
FIG.6 is a top plan view of the press of FIG. 2, with parts of the press removed for clarity, showing the gripper assembly at the front end of the guide rail element.
Figure 7:
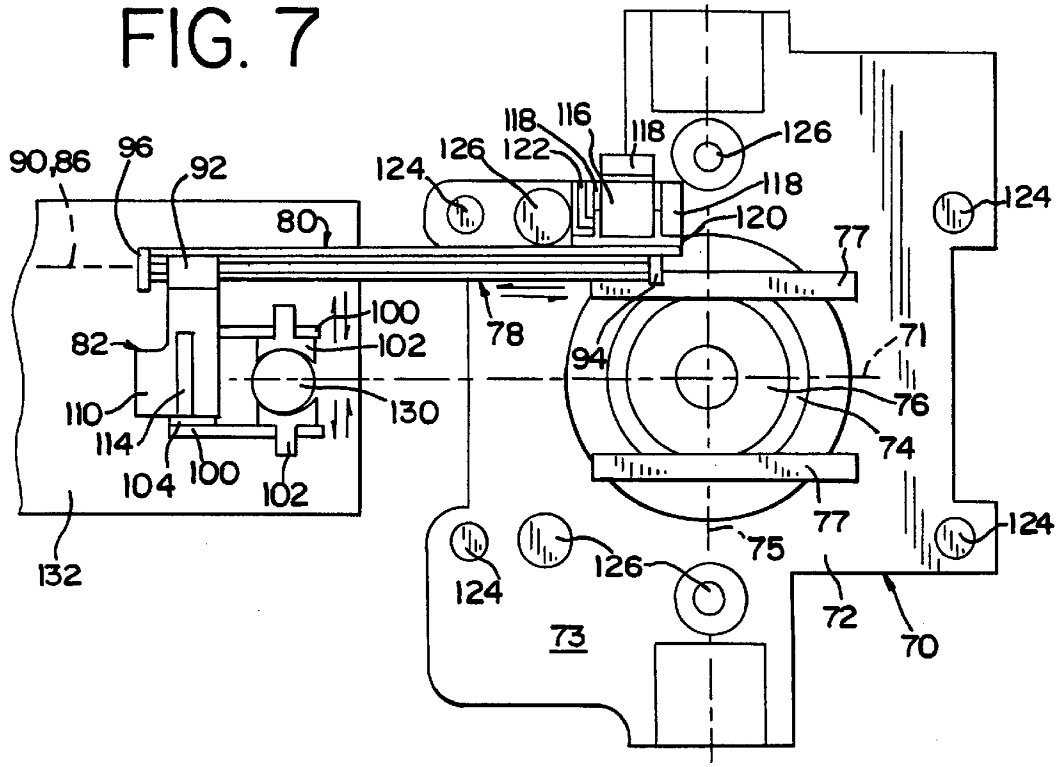
FIG. 7 is a top plan view of the press of FIG. 2, with parts of the press removed for clarity, showing the gripper assembly carrying a compact and moved to the back end of the guide rail element.

As shown in FIGS. 6–7, the guide rail element 80 is positioned on one side of the press transverse plane 75. The transverse plane 75 is shown extending through the die and die space in the accompanying drawings, but it should be understood that the plane could be forward or back of the illustrated position. As discussed below and as shown in FIGS. 6–7, the entire guide rail element 80 remains on the same side of the transverse plane 75 throughout the range of motion of the gripper assembly 82.

The guide rail element 80 may comprise a commercially available product. In the illustrated embodiment of the present invention, the guide rail component 80 comprises an "ULTRAN SLIDE" brand rodless cylinder and guide rod system available from Bimba Manufacturing Co. of Monee, Ill. In this product, the tube 88 is hollow, with a piston inside. The piston is pneumatically operated. The piston is magnetically coupled to a slide 92.

The slide 92 is mounted on the guide rail element 80 for movement along the guide rail element in a direction spaced from and parallel to the press longitudinal plane 71. The slide 92 includes bearings (not shown) and is mounted on both guide rods 88 through the bearings. The bearings provide for smooth movement of the slide back and forth along the guide rods 84 toward the front and back ends 94, 96 of the guide rail element 80. Thus, movement of the piston in the tube 88 moves the slide 92 on the guide rods 84 and tube 88. Throughout the range of motion of the slide 92, the guide rods 84 and tube 88 are stationary; only the interior piston of the element 80 moves, and the entire guide rail element 80 remains on the same side of the press transverse plane 75 throughout the range of motion of the slide 92; a part of the gripper assembly 82 does cross the transverse plane 75 during part of the range of motion of the slide.

The picker system 78 of the present invention also includes a gripper assembly 82 mounted on the guide rail element 80. The gripper assembly 82 includes a pair of gripper arms 100 supported for movement with the slide 92. One gripper arm is on each side of the vertical press longitudinal plane. At least a portion of each gripper arm 100 is movable toward and away from the vertical press longitudinal plane 71 to engage and release a compact. At least a portion of each gripper arm 100 is movable toward and away from the surface 73 of the platen 72 to raise the compact from the level of the platen surface after the gripper arms have engaged the compact. The entire gripper assembly may then be moved away from the die along the guide rods 84 and tube 88, to a location spaced from the die and platen. The gripper arms may then be lowered and moved apart to set the compact down on a surface at the location spaced from the die and platen. The compact may then be further treated, as by sintering, coining, or other standard procedures for the type of product being produced.

To engage the fragile compacts, each gripper arm 100 includes a removable gripper finger 102. In the illustrated embodiment, each gripper finger 102 is received in a complementary slot in the gripper arm, and the spacing between the facing gripper fingers may be adjusted and set. The gripper fingers extend laterally from each gripper arm 100 toward the vertical press longitudinal plane 71. The gripper fingers may be shaped for a specific part, to engage a particular feature on the compact, and alternate gripper fingers may be provided for alternate compacts.

To move the gripper arms 100 and gripper fingers toward and away from the vertical press longitudinal plane 71 to engage and disengage from a compact, the gripper assembly 82 includes a lateral movement mechanism 104. In the illustrated embodiment, the lateral movement mechanism comprises a double-acting air cylinder with two opposing pistons. The pistons are within a center body and are connected to two jaws through support shafts. The pistons move the two jaws toward and away from the vertical press longitudinal plane 71. The pistons are air operated in the illustrated embodiment. Each jaw is fixed to one of the gripper arms 100 so that the gripper arm moves with the jaw. The jaws may be fixed to the gripper arms in a conventional manner, such as through screws, bolts or adhesive. Suitable lateral movement mechanisms are commercially available, such as a Model RPW-500-1 Parallel Gripper, available from Robohand Inc. of Monroe, Conn.. This mechanism has a stroke of 1½ inches and a grip force of up to 146 pounds, depending on the air pressure supplied, and allows for synchronous movement of the two gripper arms. It should be understood that this particular lateral movement mechanism is identified for purposes of illustration only, and that the present invention is not limited to use of this lateral movement mechanism. Other commercially available devices may be used. For example, it may be desirable to use a hydraulic mechanism, or a pair of solenoids and plungers, or two pneumatic or hydraulic mechanisms. Instead of moving the gripper arms laterally, it may be desirable to connect the gripper arms at a pivot and to pivot them open and closed through any commercially available mechanism.

Figure 1:
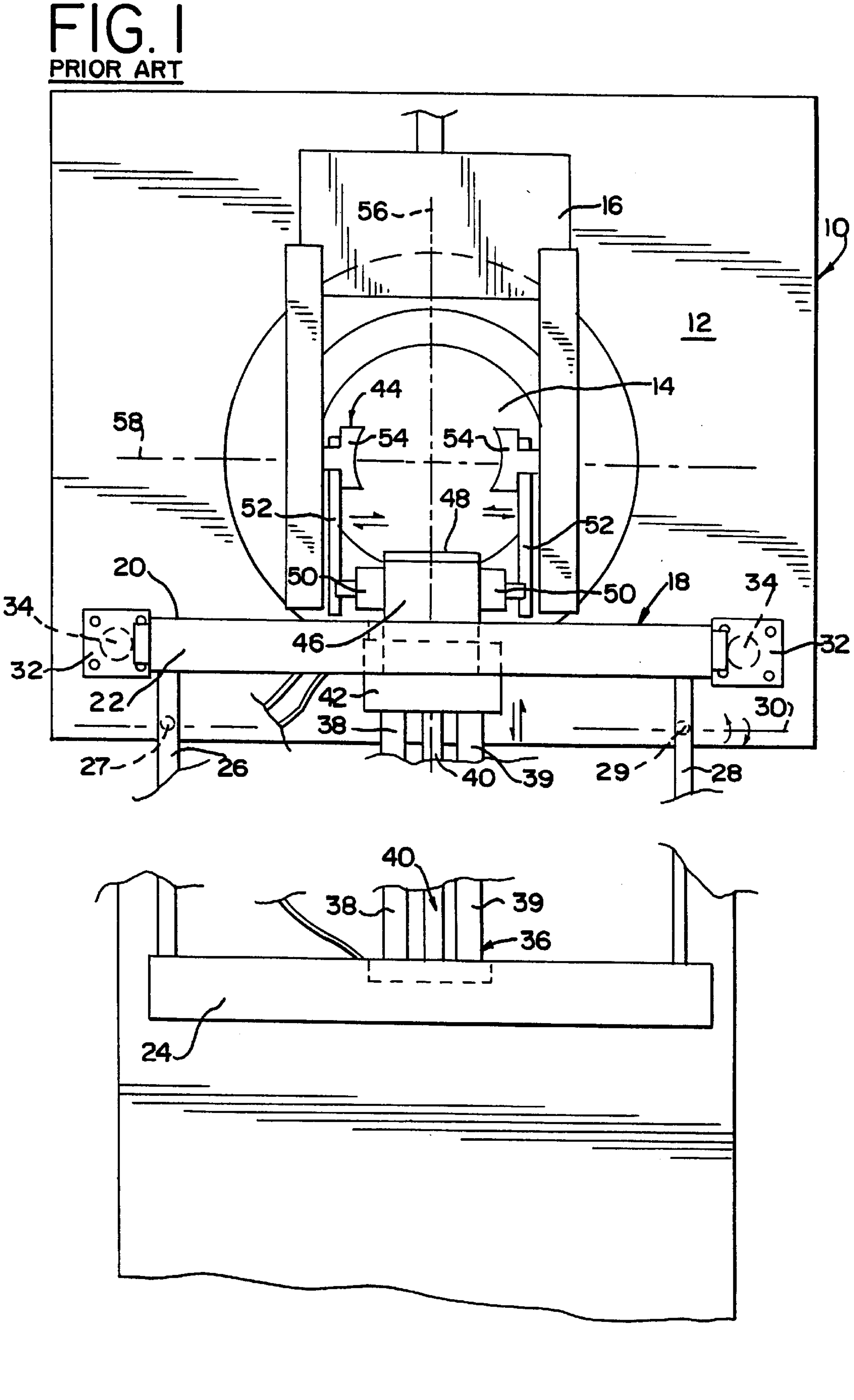
FIG. 1 PRIOR ART
FIG. 1 is a top plan view of a prior art press with a prior art picker assembly in place.

The illustrated gripper assembly 82 also includes a vertical movement mechanism 106 to move the gripper arms 100 vertically toward and away from the platen 72. In the illustrated embodiment, the vertical movement mechanism 106 comprises a commercially available air-operated guide cylinder. Suitable vertical movement mechanisms are commercially available, such as the Series MGP Compact Guide Cylinder available from SMC Pneumatics, Inc. of Indianapolis, Ind., Model MGPM25-20A, having a bore size of 25 mm and a cylinder stroke of 20 mm. It should be understood that this particular vertical movement mechanism is identified for purposes of illustration only, and that the present invention is not limited to use of this vertical movement mechanism. Other commercially available devices may be used. For example, it may be desirable to use a hydraulic mechanism, or a solenoid and plunger. In addition, it may be desirable to use a bellows arrangement, like that shown in FIG. 1, or some other mechanism for pivoting the guide rail element 80 to raise and lower the gripper arms and compact.

In the illustrated gripper assembly 82, the lateral movement mechanism 104 is connected to the vertical movement mechanism 106 through a vertical mounting plate 108. All three of these elements straddle the press longitudinal plane 71. A part of each of the movement mechanisms 104, 106 is fixed to opposite vertical faces of the mounting plate 108 by conventional means, such as by screws, bolts, or adhesives for example.

The vertical movement mechanism 106 is also connected to a horizontal mounting member or plate 110. The horizontal mounting member 110 is fixed to a vertical plate 112 that is fixed to the slide 92; thus, the horizontal mounting member 110 is fixed to move with the slide 92. Accordingly, the vertical movement mechanism 106, vertical mounting plate 108, lateral movement mechanism 106, gripper arms 100 and gripper fingers 102 all move with movement of the slide 92.

Figure 5:
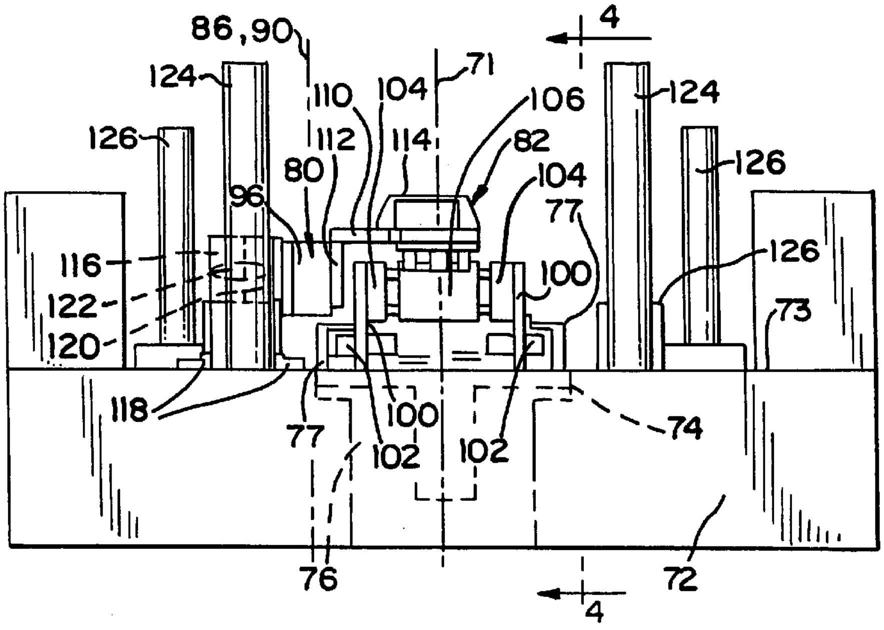
FIG. 5 is an elevation of the press of FIG. 2, taken along line 5—5 of FIG. 4, with parts of the press removed for clarity, and with the gripper assembly at the front end of the guide rail element.

The horizontal mounting member 110 extends laterally away from the slide 92 toward the press longitudinal plane 71, and extends over the press longitudinal plane 71, as shown in FIGS. 5 and 6. Instead of separate horizontal and vertical elements 110, 112, a single L-shaped element could be used to connect the vertical movement mechanism 106 to the slide 92.

The horizontal mounting member 110 has a standard handle 114 fixed to its top surface by screws, bolts or other conventional fastening means. The handle 114 may be used for holding the gripper assembly 82 as the picker system 78 is installed or removed from the press 70.

In the illustrated embodiment, the picker system 78 is supported on the platen 72 of the press 70 by a single upright mounting post 116 on the platen 72. The upright mounting post 116 is spaced from the die 76 and die space 74 in the platen 72. The picker system 78 is removably mounted on the upright mounting post 116 so that the guide rail element 80 extends outward substantially horizontally from the upright mounting post 116. The upright mounting post 116 may provide the sole support for the picker system 78 on the platen 72, or an additional support may be provided. The additional support may comprise a rod fixed to the guide rail element 80, for example, with an end resting upon the platen upper surface 73. The upright mounting post 116 is positioned so that the entire guide rail element 80 is spaced from the die 76 and die space 74.

The upright mounting post 116 may comprise a commercially available product. In the illustrated embodiment, the upright mounting post 116 comprises an aluminum extrusion having a length of about 6½ inches. A suitable post is available from 80/20 Inc. of Columbia City, Ind., Part No. 3030. Brackets or joining plates 118 available from that supplier may be used to fix the upright post 116 to the surface 73 of the platen 72 along the four sides of the post. This extrusion has a plurality of channels running the length of the extrusion, and the picker system 78 may be mounted on the extrusion through a slide or linear bearing element 120. The linear bearing element 120 is available from the same supplier. In the illustrated embodiment, the linear bearing element 120 is three-sided and is fixed to bearing elements shaped to fit within the channels in the extrusion so that the linear bearing element 120 may be easily slid up and down the length of the upright post. To fix the position of the linear bearing element 120 on the upright post 116, a brake lever 122 is included on one side of the linear bearing element 120; the brake lever 122 is also available from the same supplier as model 6800. The linear bearing element 120 is fixed to the guide rail element 80 near the front end 94 of the guide rail element 80. Thus, the linear bearing element 120 supports the guide rail element 80, including the slide 92, and the gripper assembly 82 on the upright mounting post 116. The picker system 78 is slidable vertically on the upright mounting post 116 to mount and remove the picker system 78 from the press 70.

Figure 4:
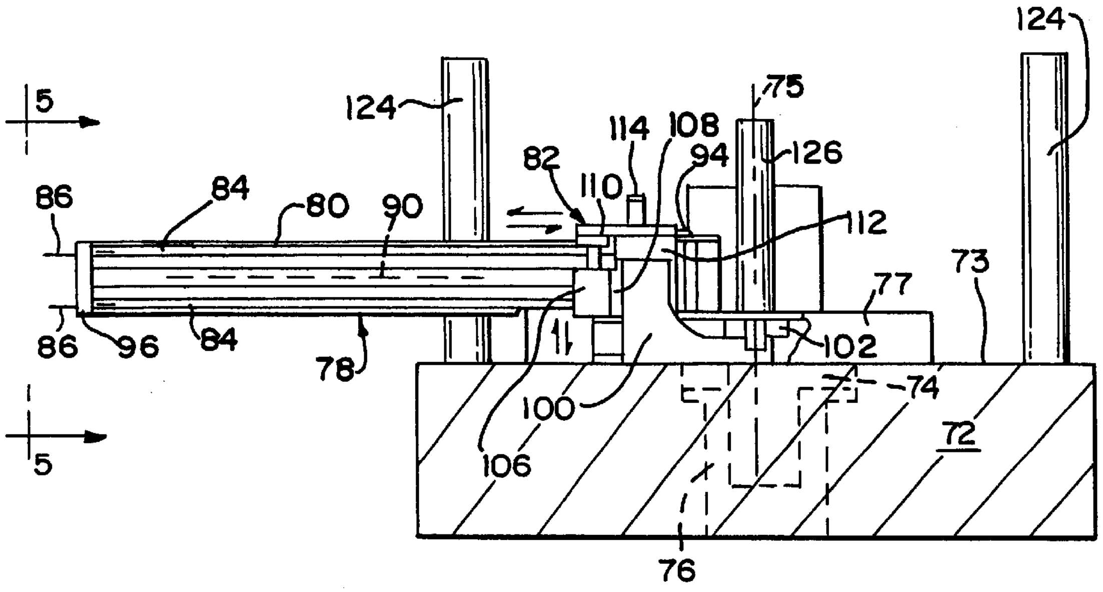
FIG. 4 is cross-section of the press of FIG. 2, taken along line 4—4 of FIG. 5, with parts of the press removed for clarity, and with the gripper assembly at the front end of the guide rail element.

The press 70 may also have conventional elements, such as guide rods 124 to guide movement of the platen 72 and die control rods 126 for control of movement of the platen 72. In FIG. 4, some of the guide rods 124, die control rods 126 and part of the platen are removed for clarity of illustration.

To assemble the press 70 of the present invention, the upright mounting post 116 is fixed to the platen surface 73 by bolting the brackets 118 to the upright mounting post 116 and to the platen 72. The picker system 78 is then mounted on the upright post by sliding the linear bearing element 120 vertically downward over the top of the post to the desired level. The position of the picker system 78 may then be fixed by turning the brake lever 122.

During operation of the press, the feed shoe delivers raw material to the die 76 in the die space 74 through an opening or hole in the surface 73 of the platen 72. The punches are moved to compact the raw material in the die. The platen is moved downward and the compact is ejected from the die, resting on the surface of the lower punch at the level of the surface 73 of the platen 72. After being ejected, the compact is roughly centered on the vertical press longitudinal plane 71. During these steps of the process, the slide 92 and gripper assembly 82 are at or near the back end 96 of the guide rail element 80. The entire picker system and upright mounting post move with the platen as the platen moves vertically. An ejected compact is shown in FIGS. 6–7 at 130.

To move the ejected compact so that it may be further processed and another compact made in the die, the tube 88 of the guide rail element 80 may be pressurized to move the interior piston from the back end 96 to the front end 94 of the guide rail element 80. As the piston so moves, the slide 92 is also moved from the back end 96 to the front end 94. As the slide 92 moves, the mounting plates 112 and 110 are also moved. As the mounting plate 110 is moved toward the front end 94, the vertical and lateral movement mechanisms 106, 104 are moved with the plate 110, and the gripper arms 100 and gripper fingers 102 move with the lateral movement mechanism toward the front end 94 of the guide rail assembly and toward the compact at the die 76, to the position shown in FIGS. 2–6.

As shown in FIG. 6, when the gripper fingers 102 reach the compact 130, at least parts of the gripper fingers are across the transverse plane 75 from the guide rail element 80, and the gripper fingers are laterally spaced from the compact 130 at the die 76. The lateral movement mechanism 104 may then be actuated to move the gripper arms 100 and gripper fingers 102 toward the press longitudinal plane 71 and the compact that is at the press longitudinal plane. After the gripper fingers contact the compact, the vertical movement mechanism 106 may be actuated. As the vertical movement mechanism is actuated, the gripper arms 100, gripper fingers 102 and compact 130 are lifted toward the horizontal mounting member 110, and the compact 130 is raised off of the punch support surface at the level of the surface 73 of the platen 72. The pressure in the tube 88 is then changed so that the interior piston moves toward the back end 96 of the guide rail element 80, moving the slide 92, gripper assembly 82 and compact 130 with it, as shown in FIG. 7. When the desired drop-off position is reached, spaced from the die, and the platen, the vertical movement mechanism 106 may be actuated to move away from the horizontal mounting member 110, lowering the gripper arms 100, gripper fingers 102 and compact toward a receiving surface 132. The lateral movement mechanism 104 may then be actuated to move the gripper arms 100 and gripper fingers 102 away from the press longitudinal plane 71 and away from the compact 130, leaving the compact 130 on the receiving surface 132. The vertical movement mechanism 106 may then be actuated to raise the gripper arms 100 and gripper fingers 102 toward the horizontal mounting member 110. The receiving surface 132 may comprise a conveyor, for example, to move the compact 130 to a storage or gathering location or to another processing station for further processing, such as sintering. The process is repeated as additional compacts are formed at the die 76. Throughout this process, the guide rail element remains on the same side of the transverse plane 75, while parts of the gripper arms 100 cross the illustrated transverse plane 75; the guide rods 84 and tube remain stationary while the slide 92 and interior piston move.

If the die 76 becomes dirty or needs to be changed to make a different style of compact, the gripper assembly 82 may be moved toward the back end 96 of the guide rail element 80. With the gripper assembly so positioned, the die is not blocked or obstructed by the picker system 78. Instead, the area of the die 76 is accessible without interference from the picker system, and the die can be inspected, cleaned or changed without removing the picker system 78 from the platen 72. However, if desired, the picker system 78 can easily be removed from the press to clean or change the die.

When it is desired to remove the picker system 78 from the press, removal is a simple process. With the gripper assembly 82 at the front end 94 of the guide rail system, the brake lever 122 is turned to release the brake. The picker system 78 may then be raised by lifting on the handle 114 and the guide rail element 80 to slide the linear bearing element 120 and the entire picker system vertically upward off of the upright mounting post 116.

Thus the present invention increases efficiency in the manufacture of compacts. Work can be done in the area of the die 76 without removing the picker system from the press. When desired, the picker system 78 can be removed from the press 70 in a quick and simple manner, and then quickly and simply reinstalled on the press.

It should be understood that although the picker system of the present invention is illustrated with a particular style of press, the invention is not limited to the illustrated press. For example, the press may be of the type without rails 77 for holding down the feed shoe; the table or platen need not move as in the illustrated embodiment, but some other mechanism may be used to eject the compact from the die. And although the invention is expected to have particular utility in making powder metal compacts, it should be understood that it may be used in making other types of compacts as well.

While only a specific embodiment of the invention has been described and shown, it is apparent that various alternatives and modifications can be made thereto. Those skilled in the art will recognize that certain modifications can be made in these illustrative embodiment. It is, therefore, the intention in the appended claims to cover all such modifications and alternatives as may fall within the true scope of the invention.

We claim:

1. A press for making compacts from a raw material, said press comprising:

a platen with a die space;

a die in the die space in the platen;

said press having a vertical press longitudinal plane at the center of said die space in said platen, a vertical press transverse plane perpendicular to said press vertical longitudinal plane, said vertical press longitudinal and transverse planes intersecting the surface of said platen, at least part of the surface of the platen lying in a non-vertical plane;

a guide rail element laterally spaced from said die, said guide rail element being offset from said vertical press longitudinal plane and positioned on one side of said vertical press transverse plane, at least part of said guide rail element overlying at least part of said platen;

a slide mounted on said guide rail element for movement along said guide rail element in a direction parallel to and spaced from said vertical press longitudinal plane, said guide rail element remaining on the same side of the vertical press transverse plane throughout the range of motion of said slide, said slide being movable to a position wherein at least part of said slide overlies at least part of said platen;

a pair of gripper arms supported for movement with said slide, one gripper arm being on each side of said vertical press longitudinal plane, at least a portion of each of said gripper arms being movable toward and away from said vertical press longitudinal plane to engage and release a compact, said gripper arms being offset along said vertical press transverse plane from a longitudinal plane through said slide.

2. The press of claim 1 further comprising a gripper finger removably mounted on each gripper arm and extending laterally from each gripper arm toward said vertical press longitudinal plane.

3. The press of claim 1 further comprising a mounting member fixed to move with said slide and extending laterally away from said slide toward said vertical press longitudinal plane, and a vertical movement mechanism mounted to said mounting member for moving said gripper arms vertically toward and away from said platen.

4. The press of claim 3 further comprising a lateral movement mechanism mounted to said vertical movement mechanism for moving said gripper arms toward and away from said vertical press longitudinal plane.

5. The press of claim 1 wherein said guide rail element includes a plurality of vertically spaced guide rails, said guide rails having horizontal central axes lying in a single vertical plane, said slide being mounted on both of said guide rails for movement along said guide rails.

6. The press of claim 1 further comprising a post extending vertically upward from said platen at a position spaced from said die space in said platen, said guide rail element being removably mounted on said post, said post providing the sole support for said guide rail element.

7. The press of claim 6 further comprising a mounting plate fixed to said guide rail element for removably mounting said guide rail element to said post.

8. The press of claim 7 wherein said guide rail element includes a plurality of vertically aligned and vertically spaced guide rails, said guide rails having central axes lying in a single vertical plane, said slide being mounted on both of said guide rails for movement along said guide rails.

9. The press of claim 8 further comprising a mounting member fixed to move with said slide and extending laterally away from said slide toward said vertical press longitudinal plane, and a vertical movement mechanism mounted to said mounting member for moving said gripper arms vertically toward and away from said platen.

10. The press of claim 9 wherein further comprising a lateral movement mechanism mounted to said vertical movement mechanism for moving said gripper arms toward and away from said vertical press longitudinal plane.

11. The press of claim 10 further comprising a gripper finger removably mounted on each gripper arm and extending laterally from each gripper arm toward said vertical press longitudinal plane.

12. A press for making compacts from a raw material, said press comprising:

a platen with a die space;

a die in the die space in the platen;

an upright mounting post on the platen, the upright mounting post being spaced from said die and said die space;

a picker system for moving compacts, said picker system including a guide rail element and a movable gripper assembly mounted on the guide rail element;

said picker system being removably mounted on said upright mounting post so that said guide rail element extends outward from said upright mounting post, said picker system being slidable vertically on said upright mounting post to mount and remove the picker system;

said mounting post being positioned so that the entire guide rail element is spaced from said die and said die space and said gripper assembly is movable to a position overlying said die and said die space.

13. A press for making compacts from a raw material, said press comprising:

a platen with a die space;

a die in said die space;

said press having a vertical press longitudinal plane at the center of said die space in said platen, a vertical press transverse plane perpendicular to said vertical press longitudinal plane, said vertical press longitudinal and transverse planes intersecting the surface of said platen, at least part of the surface of the platen lying in a non-vertical plane;

an upright mounting post extending upwardly from the surface of the platen at a position spaced from said die space and said die, a picker system for moving compacts, said picker system including:

a guide rail element laterally spaced from said die, said guide rail element being offset from said vertical press longitudinal plane and positioned on one side of said vertical press transverse plane;

a slide mounted on said guide rail element for movement along said guide rail element in a direction parallel to and spaced from vertical press longitudinal plane;

a pair of gripper arms supported for movement with said slide, one gripper arm being on each side of said vertical press longitudinal plane, at least a portion of each of said gripper arms being movable toward and away from said vertical press longitudinal plane to engage and release a compact, said gripper arms being offset from said slide;

said guide rail element remaining on the same side of said vertical press transverse plane throughout the range of motion of said slide;

said picker system being removably mounted on said upright mounting post so that said guide rail element extends outward from said upright mounting post, said picker system being slidable vertically on said upright mounting post to mount and remove said picker system from the press; and wherein the weight of the entire picker system is supported on the platen on one side of the vertical press longitudinal plane.

14. The press of claim 13 wherein said guide rail element includes a plurality of vertically aligned and vertically spaced guide rails, said guide rails having central axes lying in a single vertical plane, said slide being mounted on both of said guide rails for movement along said guide rails.

15. The press of claim 13 further comprising a gripper finger removably mounted on each gripper arm and extending laterally from each gripper arm toward said vertical press longitudinal plane.

16. The press of claim 13 further comprising a mounting member fixed to move with said slide and extending laterally away from said slide toward said vertical press longitudinal plane, and a vertical movement mechanism mounted to said mounting member for moving said gripper arms vertically toward and away from said platen.

17. The press of claim 16 further comprising a lateral movement mechanism mounted to said vertical movement mechanism for moving said gripper arms toward and away from said vertical press longitudinal plane.

18. The press of claim 17 wherein said guide rail element includes a plurality of vertically aligned and vertically spaced guide rails, said guide rails having central axes lying in a single vertical plane, said slide being mounted on both of said guide rails for movement along said guide rails.

19. The press of claim 18 further comprising a gripper finger removably mounted on each gripper arm and extending laterally from each gripper arm toward said vertical press longitudinal plane.

20. The press of claim 13 wherein at least a part of each of said gripper arms extends across said vertical press transverse plane during a cycle of operation of said picker system.

* * * * *